United States Patent
Tee

(10) Patent No.: US 10,027,553 B2
(45) Date of Patent: *Jul. 17, 2018

(54) DISTRIBUTED SYSTEM FOR SELF UPDATING AGENTS AND ANALYTICS

(71) Applicant: MOOGSOFT, INC., San Francisco, CA (US)

(72) Inventor: Philip Tee, San Francisco, CA (US)

(73) Assignee: Moogsoft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,689

(22) Filed: May 11, 2017

(65) Prior Publication Data

US 2017/0250873 A1    Aug. 31, 2017

Related U.S. Application Data

(63) Continuation of application No. 14/606,946, filed on Jan. 27, 2015.

(51) Int. Cl.
*H04L 12/24* (2006.01)
*H04L 29/06* (2006.01)
*H04L 12/26* (2006.01)

(52) U.S. Cl.
CPC .......... *H04L 41/142* (2013.01); *H04L 41/046* (2013.01); *H04L 41/12* (2013.01); *H04L 41/22* (2013.01); *H04L 43/0823* (2013.01); *H04L 43/10* (2013.01); *H04L 67/42* (2013.01)

(58) Field of Classification Search
CPC ...................................... H04L 41/142
USPC ......................................... 709/224
See application file for complete search history.

(56) References Cited

U.S. PATENT DOCUMENTS

| 2002/0107958 | A1* | 8/2002 | Faraldo, II | ............. H04L 41/00 709/224 |
| 2013/0007093 | A1* | 1/2013 | Knox | ....................... G06F 9/54 709/202 |

\* cited by examiner

*Primary Examiner* — David Lazaro
*Assistant Examiner* — Zia Khurshid
(74) *Attorney, Agent, or Firm* — Paul Davis

(57) ABSTRACT

A distributed system includes a plurality of managed devices of an infrastructure that includes a plurality of system parameters. At least one agent is in communication with the managed devices. The at least one agent is configured to determine which of a managed device it runs on. A server is in communication with the at least one agent, with the at least one agent communicating over a subscribed bus. A portal bridge is in communication with the bus and communicates through a client's firewall to a Network System. A server is provided with a database of anomies and time series, wherein a repository of system parameters run on the server.

15 Claims, 6 Drawing Sheets

DISTRIBUTED SYSTEM FOR SELF UPDATING AGENTS AND ANALYTICS

CROSS-REFERENCE TO RELATED APPLICATIONS

This application is a Continuation Application of U.S. patent application Ser. No. 14/606,946, filed Jan. 27, 2015, which is listed above is fully incorporated herein by reference for all purpose.

BACKGROUND

Field of the Invention

The present invention is directed to distributed systems, and more particularly to distributed systems that use self-updating agents and analytics for system monitoring.

Description of the Related Art

In a data processing environment, data collection is the process of collecting values for computer system or network metrics using a data collection facility, such as SNMP.

SNMP is a protocol used by network hosts to exchange information used in the management of networks, such as Internet Protocol (IP) networks. SNMP network management is based on the client and server model. An SNMP client sends a request for SNMP data to an SNMP managed server or host. Each managed host runs a process called an agent, known as an SNMP Agent. The SNMP agent is a server process that maintains a management information base (MIB) database for the host. The SNMP managed host sends a response that includes the requested data that is stored in the management information base to the SNMP client.

Existing procedural approaches to SNMP data collection suffer from a number of drawbacks. Procedural solutions are typically developed and optimized for a certain data collection scenario (i.e., within a particular computer environment) and reflect a certain set of assumptions. As a result, an SNMP collection procedure may become sub-optimal or unsuitable when used in a different environment.

Large Internet Service Providers (ISPs) and carriers have multiple families and generations of networking equipment with various SNMP-related idiosyncrasies and constraints. The same logical data (e.g., interface octet counter) can be collected in a number of alternative ways, some of which are better than the others. For instance, a straightforward SNMP data collection procedure may produce poor data collection results, while a sophisticated SNMP data collection procedure which offers better data collection results may be difficult to develop.

Although brute-force data collection methods may be used which systematically enumerate all possible data collection candidates for a procedural solution and check whether each data collection candidate satisfies the problem's statement, many brute-force data collection procedures scale poorly when management information base tables become very large. Thus, size and scale of the management information base tables in an SNMP environment may dictate using different procedures for collecting SNMP data. In addition, the complexity of a procedural solution increases very rapidly when a data collection scenario involves correlating data from a number of related management information base tables.

SNMP uses one or more managers to monitor and manage hosts and devices on computer networks. Each managed system executes an agent. The agent then reports information using SNMP to the manager.

SNMP provides variable accessibility organized in hierarchies. These hierarchies, and other metadata (such as type and description of the variable), are described by the MIBs.

However, MIB is an arcane language, not properly machine readable and usually object oriented. With SNMP the agent(s) manage the MIB(s), and update them. The agents are heavily dependent on a static difficult update. With SNMP it is difficult to update the agent(s).

SUMMARY

An object of the present invention is to provide improved monitoring and management for distributed systems.

Another object of the present invention is to provide distributed systems with a single point of definition and control of management policy.

Still another object of the present invention is to provide distributed systems that make it easier to control consistently.

An object of the present invention is to provide distributed systems where management policy at the agent is automatically sent policy updates.

Yet another object of the present invention is to provide distributed systems with management policies set in human readable and machine formats.

A further object of the present invention is to provide distributed systems with a single agent.

Still another object of the present invention is to provide distributed systems that can install at the agent(s) updates and changes to all management policies.

An object of the present invention is to provide distributed systems where anomaly detection is performed at the agent and reported centrally to provide scalability and reduce noise.

A further object of the present invention is to provide distributed systems that use self-updating agents and analytics.

Another object of the present invention is to provide distributed systems that enable executable agent definition language.

Another object of the present invention is to provide distributed systems and their associated methods that enable executable agent definition language.

These and other objects of the present invention are provided in a distributed system that includes a plurality of managed devices of an infrastructure which includes a plurality of system parameters. At least one agent is in communication with the managed devices. The at least one agent is configured to determine which of a managed device it runs on. A server is in communication with the at least one agent, with the at least one agent communicating over a subscribed bus. A portal bridge is in communication with the bus and communicates through a client's firewall to a Network System. A server is provided with a database of anomies and time series, wherein a repository of system parameters run on the server.

DETAILED DESCRIPTION

Figure 1A:
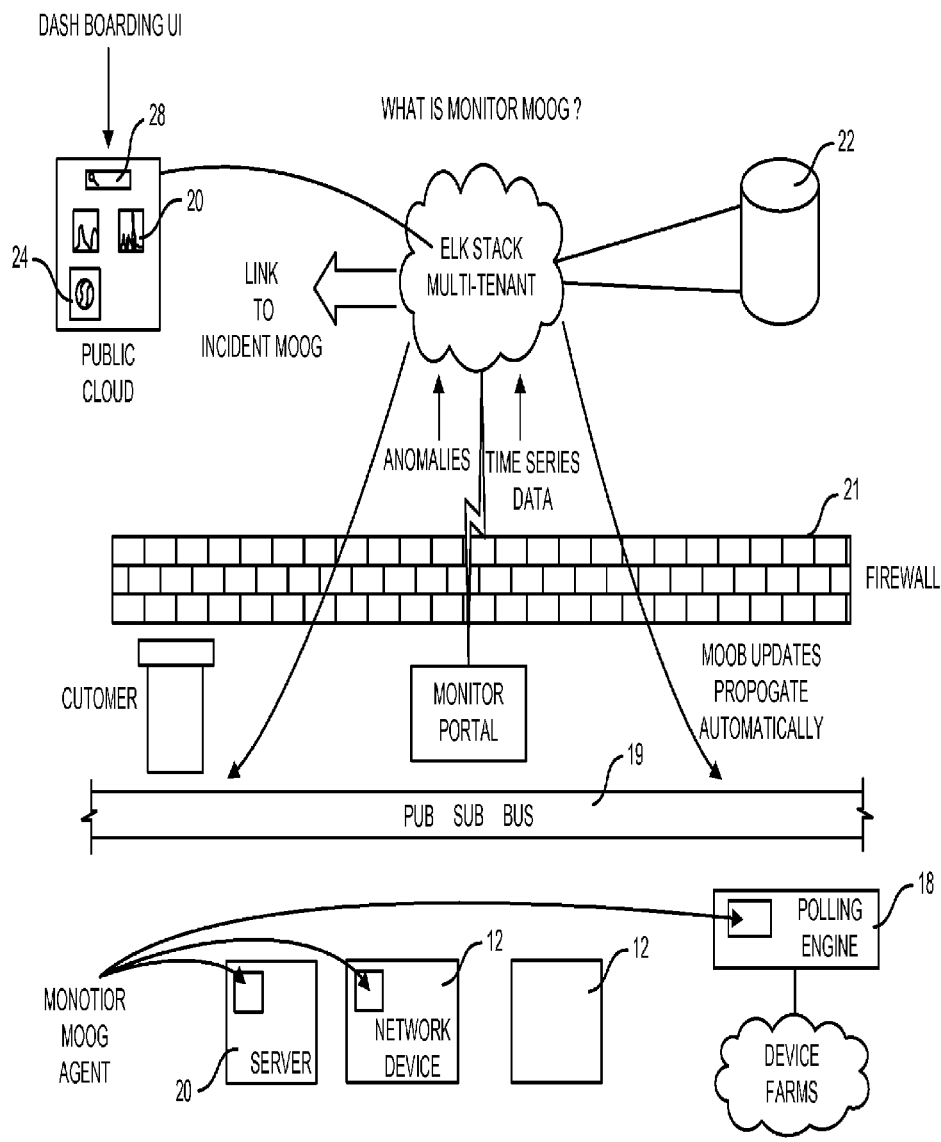
FIG. 1(a) illustrates one embodiment of a distributed system with a plurality of managed devices with monitoring system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/0 devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "Infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein, "event message" or "event" is defined as a change in state. An event is anything that happens, or is contemplated as happening in message form or event form relating to infrastructure. An event can include a time stamp, and a name for the entity changing state.

As used herein "Cloud or Client device Application" refers to cloud or client device application services or "software as a service" (SaaS) which deliver software over the Network Systems eliminating the need to install and run the application on a device.

As used herein "Cloud or Client device Platform" refers to a cloud or client device platform services or "platform as a service" (PaaS) which deliver a computing platform and/or solution stack as a service, and facilitates the deployment of applications without the cost and complexity of obtaining and managing the underlying hardware and software layers.

As used herein "Cloud Infrastructure" refers to cloud infrastructure services or "infrastructure as a service" (LAAS) which deliver computer infrastructure as a service with raw block storage and networking.

As used herein the term "Managed Device" is anything on a computing device, anything in a distributed system, firewalls, routers, servers, and anything in managed device, servers, routers, firewalls, and the like.

As used herein, a "Moab" includes a list of monitored system parameters including but not limited to system performance parameters, network availability tests, log messages and other sources of system health. A Moab can be a JSON object literal containing both data format definitions, additional resource definitions, including but not limited to third party libraries and active policy, and have prototypal inheritance. A Moab can provide an "updater" method which references a Java script function. The Moab file can be a defined Java script program file, and associated Java libraries necessary to implement the functionality in the "updater" method import different Moab, a list of individual parameters, values, that can be monitored that have relevance to the Moab file. Each managed device of a system can have a plurality of Moobs. As a non-limiting example a generic agent knows which Moobs it needs to ask the central control point and then changes can be automatically sent out. A Moab can be both human and machine readable, used for policy/definition and implementation in one place, As used herein a "Moobel" is a single monitored system parameter that is part of a Moab, including but not limited to system performance parameters, network availability tests, log messages and other sources of system health. A Moobel describes monitored system parameters. As a non-limiting example the Moobel can define anomalies, delete the syntax, and the like.

The present invention provides distributed systems that include a plurality of autonomous computers connected through a network. Distributed middleware enables computers to coordinate their activities and to share the resources of the system.

In one embodiment a distributed system 10 includes a collection of autonomous computers linked by a Network System, such as a computer network, and equipped with distributed system software. This software enables managed devices 12 to coordinate their activities and to share the resources of the system hardware, software, and data. The distributed system provides a single, integrated computing facility even though it may be implemented by many computers in different locations.

In one embodiment the distributed system 10 includes collections of modules, each with its own specific function, interconnected to carry out integrated data acquisition and control.

Figure 1B:
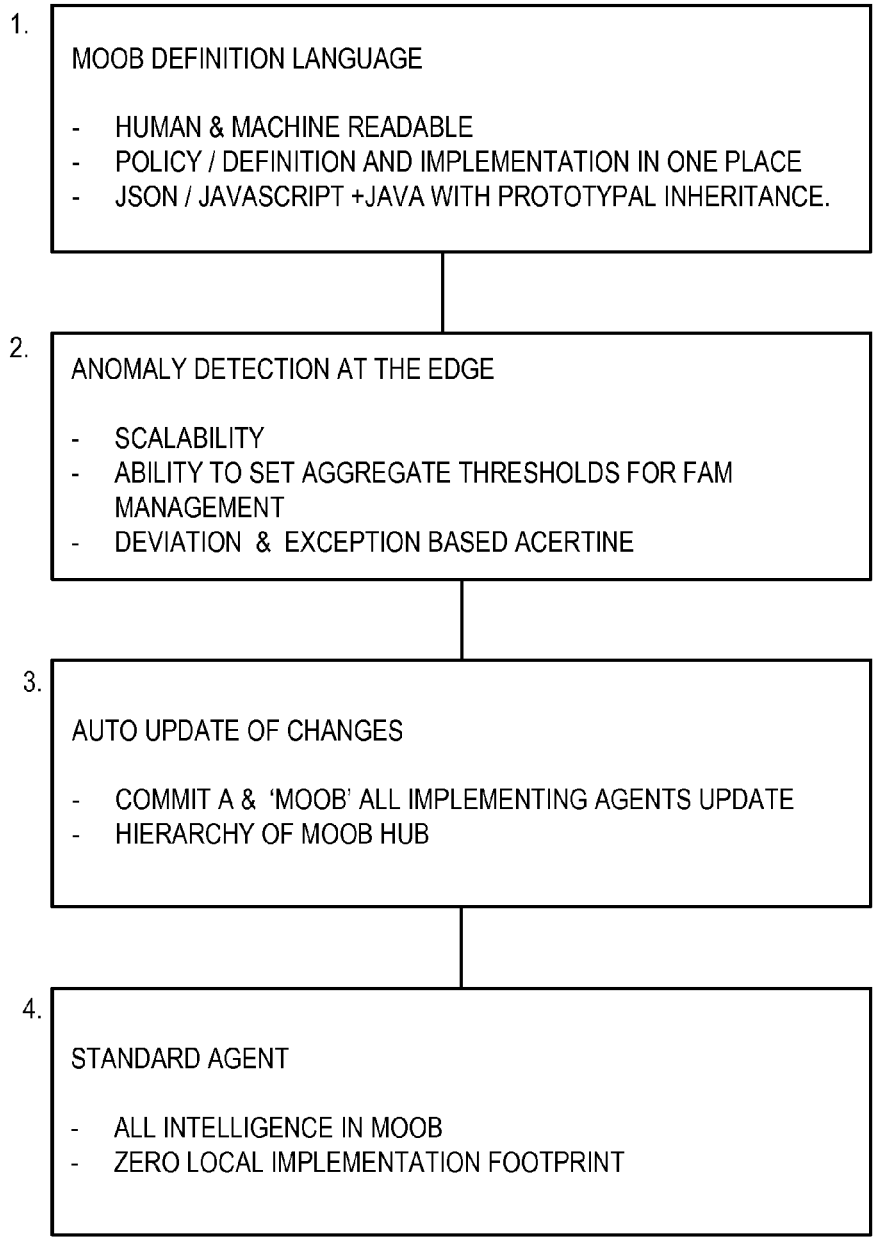
FIG. 1(b) illustrates one embodiment of the flow chart corresponding to the operations performed in FIG. 1(a).

FIG. 1(*a*) illustrates one embodiment of a distributed system 10 of the present invention of the managed devices 12. An agent 16 runs on the managed devices 12. In one embodiment one agent 16 is used. In another embodiment a plurality of agents 16 are used. The agent(s) 16 run on a dedicated polling server 18. All of the agents 16 communicated over a published subscribed bus 18. A monitor/Moab portal bridge 19 listens on the bus 18 which communicates through a client's firewall 21 to Network System, the internet, with software running in the cloud on a server 20. Server 20 has a database 22 of anomies, and time series data.

A search engine 24, which can be in the cloud, resides on top of the database 22. A web server 26 serves a user interface 28 that is used to search for anomalies.

Polling is done by (i) embedded agent polling of the managed local device 12 device that the agent 18 is running or (ii) across Network Systems 14 as a proxy agent 18.

In one embodiment a repository of moobs run on the server 18. The agent(s) 18 discover its local environment which and determines: (i) what managed device 12 it is running on; (ii) the things needing monitoring on the managed device 12; (iii) and other configuration information used to query via the portal bridge 19 to determine which moobs it needs to download and implement.

Going up through the portal bridge 19 is the time series data and the discovered anomalies. Going back down through the portal bridge 19 are any updates to moobs Referring now to the FIG. 1(*b*) flow chart, an agent starts thing up, discovers the local environment, and then communicates through the repository and retries moobs. The agent does polling and either communicates the time data series back, or detects an anomaly. For hole discovered it checks a value for an anomaly. Detected anomalies are communicated back. If an anomaly is not detected the agent sends a time series data point to the repository in the cloud. When there are changes in the moobs, the agent loads the change and restarts with the polling In one embodiment of the present invention distributed systems 10 are provided that improve monitoring and management for distributed systems.

In one embodiment of the present invention distributed systems 10 are provided with a single point of definition and control of management policy.

In one embodiment of the present invention distributed systems 10 are provided that make it easier to control consistently.

In one embodiment of the present invention distributed systems 10 are provided where management policy at the agent is automatically sent policy updates.

In one embodiment of the present invention distributed systems 10 are provided with management policies set in human readable and machine formats.

In one embodiment of the present invention distributed systems 10 are provided with a single agent.

In one embodiment of the present invention distributed systems 10 are provided that can install at the agent(s) updates and changes to all management policies.

In one embodiment of the present invention distributed systems 10 are provided where anomaly detection is performed at the agent and are reported centrally to provide scalability and reduce noise.

In one embodiment of the present invention distributed systems 10 are provided that use self-updating agents and analytics.

In one embodiment of the present invention distributed systems 10 are provided that enable executable agent definition language.

In one embodiment of the present invention distributed systems 10 are provided that enable executable agent definition language In one embodiment of the present invention distributed systems 10 are provided that embed one or more of management policies, monitored variable quantities, anomaly detection, and definitions of detected anomaly in agents coupled to the system.

In one embodiment of the present invention distributed systems 10 are provided that detect anomalies, executed by a distributed agent, which is distributed to monitored devices or dedicated agent execution computers, to provide for proxy monitoring.

In one embodiment of the present invention distributed systems 10 are provided for anomaly detection executed by a distributed agent which is distributed to monitored devices and is a generic agent.

In one embodiment of the present invention distributed systems 10 are provided for anomaly detection executed by a distributed agent is distributed to monitored devices and is a generic agent, where everything is defined from one or more Moab files.

In one embodiment of the present invention distributed systems 10 are provided for anomaly detection executed by a distributed agent is distributed to monitored device and is a generic agent that provides for Moab files and supporting resource files to be at every device.

In one embodiment of the present invention distributed systems 10 are provided for anomaly detection executed by a distributed agent, which self-updates, and is distributed to monitored devices.

In one embodiment of the present invention distributed systems 10 are provided to allow anomaly detection to be dependent upon the values of the same parameters across a plurality of monitored devices gathered by different agents.

With the present invention structured managed information writes and uses JSON, eliminating MIBs.

In one embodiment probability management policy is encoded in JSON. In one embodiment JSON is embedded with some Javascript code. With the present invention JSON becomes an object literal containing both data format definitions and active policy. This is termed a Moab.

In one embodiment a Moab includes a list of monitored system parameters (hereafter Moobels), including but not limited to system performance parameters, network availability tests, log messages and other sources of system health. The Moogles are provides with an "updater" method which references a Java script function. In one embodiment the Moab file is a defined Java script program file, and associated Java libraries necessary to implement the functionality in the "updater" method import different Moab, a list of individual parameters, values, that can be monitored that have relevance to the Moab file, a Mooble describes monitored system parameters who you monitor a parameter, each device has a plurality of Moobs, the generic agent knows which Moobs it needs to ask the central control point, the manager more, and then changes can be automatically sent out, the Moogles can define anomalies, delete the syntax, With the present invention analytics are run in the agent to implement flexible thresholds for anomaly detection. Base lining is part of that process.

All of the statistical analysis is done at the agent level.

Figure 2:
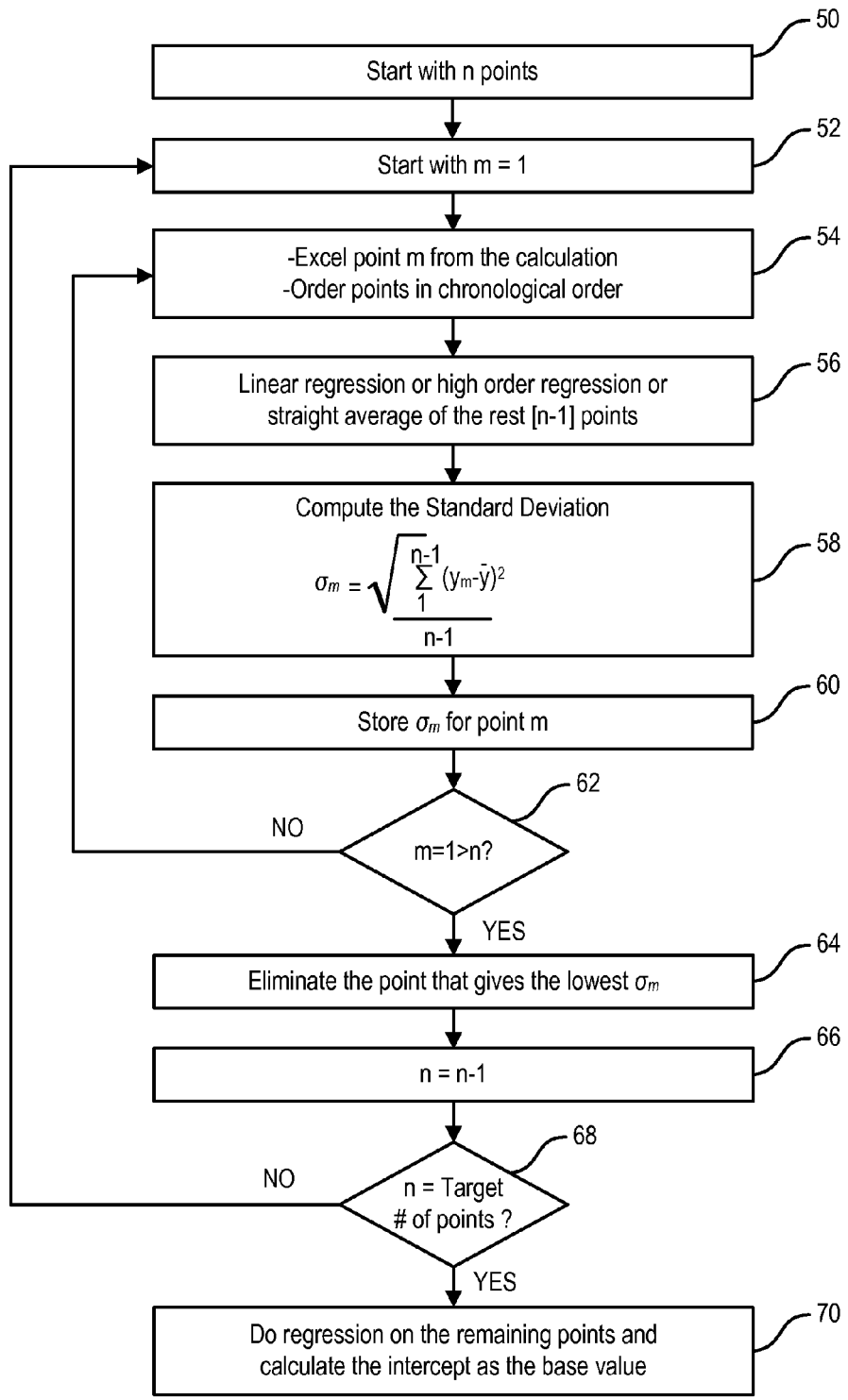
FIG. 2 is a flow chart of a baseline calculation process for use in the method of FIG. 1.

In one embodiment of the present invention the manager, agent and the structure of managed information is integrated in one place as illustrated in FIG. 2. This definition of this behavior is placed in a JSON literal, which can make reference to Java libraries to imitate the behavior.

In one embodiment agents are embedded on a device to be managed or operate in a proxy manner. The agents communicate to a gateway using the public internet. Gateway queries from the management counsel which Moobs the agent should load and run.

The agent pulls from the gateway over a message bus the relevant and predefined Moab files, auxiliary Java script files, the Java libraries and the like.

When the Moogles are centrally changed and/or updated, these changes and/or updates are propagated to all of the agents.

The functionally is supported in a Moogles that can obtain a value, set a value, run analytics on that value, report the value back, report exceptions, and the like.

At the management console it is reported to event management counsel as an event. If not then the system stores the values in a searchable external document oriented store.

The system provides a user interface to the data store to provide for flexible, search oriented dashboards. All anomalies are propagated to fault management systems such as Incident. A Moog is utilized that is a single point of definition and control of management policy, which makes it easier to control consistently With the present invention one or more of the following are achieved: management policy updates are automatically sent; management policy is sent in a in human readable and machine formats; a single agent can be used; hosting can be done at the agent level along with updating and changes of management policies anomaly detection is pushed out to the agent using to provide scalability and noise reduction In one embodiment a true or false determination is made and a Moogles can return an arbitrary deeply nested object. As a non-limiting example the system inspects the objects as being true or false, including the ability to apply a Boolean expression, against a collection of values, to determine a true or false. The system looks for a true or false of an object we look for true or false. In one embodiment true or false depends on the question being asked.

Referring to FIGS. 1 and 2, one method of the present invention uses true/false determination with a baseline calculation technique is performed to determine a baseline for each parameter in the monitoring and management of a distributed system 10.

In one embodiment of the present invention distributed systems 10 are provided with a single point of definition and control of management policy. In one embodiment the algorithm begins with the first n points in the data signal, and then discards x points to achieve the "target" number of best data points. As a non-limiting example, n can begin as n=15 and x=5 to arrive at 10 "good" data points to use in the baseline calculation. The recursive algorithm used is as follows: the first n data points (here, preferably 15) from the data signal are selected 50. An index m is set to "1" at step 52 and point m (which corresponds to the first data point of the data signal) is then temporarily ignored and a linear regression, high order regression or simple averaging is then performed on the remaining (n−1) points 56 in then set. In one embodiment a linear regression is used. The standard deviation is then calculated 58 for the (n−1) points, as follows:

$$ai = L1n-1\ (yi-y\_)2n-1$$

wherein ai is the standard deviation and yi is the individual value of the (n−1) data points.

The standard deviation is stored 60 in correlation to the ignored mth data point, and the process is repeated 62 until m=n (i.e. when m=2, the second data point is temporarily ignored (hence the coined term "odd-man out") and the standard deviations of the other n−1 points are calculated, and the result stored corresponding to the second point, until each of these n points has an associated standard deviation calculated). The standard deviation values are then compared 64 and the point in the n set having the lowest standard deviation is removed 64 (since it is thus the greatest outlier). The counter n is then set 66 to n−1 to account for the discarded point and checked at 68 to determine whether the target number of points has been reached. If not, steps 52 to 68 are repeated, and the next point with the smallest odd-man out standard deviation is also discarded, and so on, until the target number of data points is reached. When n=the target number, a second linear regression is preferably done (could also be a simple average or higher-order regression) on the target (i.e. "good") points and the intercept (or average, as the case may be) is calculated 70 to yield the calculated baseline value for that parameter. A baseline is calculated for each parametric data to be analyzed.

Figure 1C:
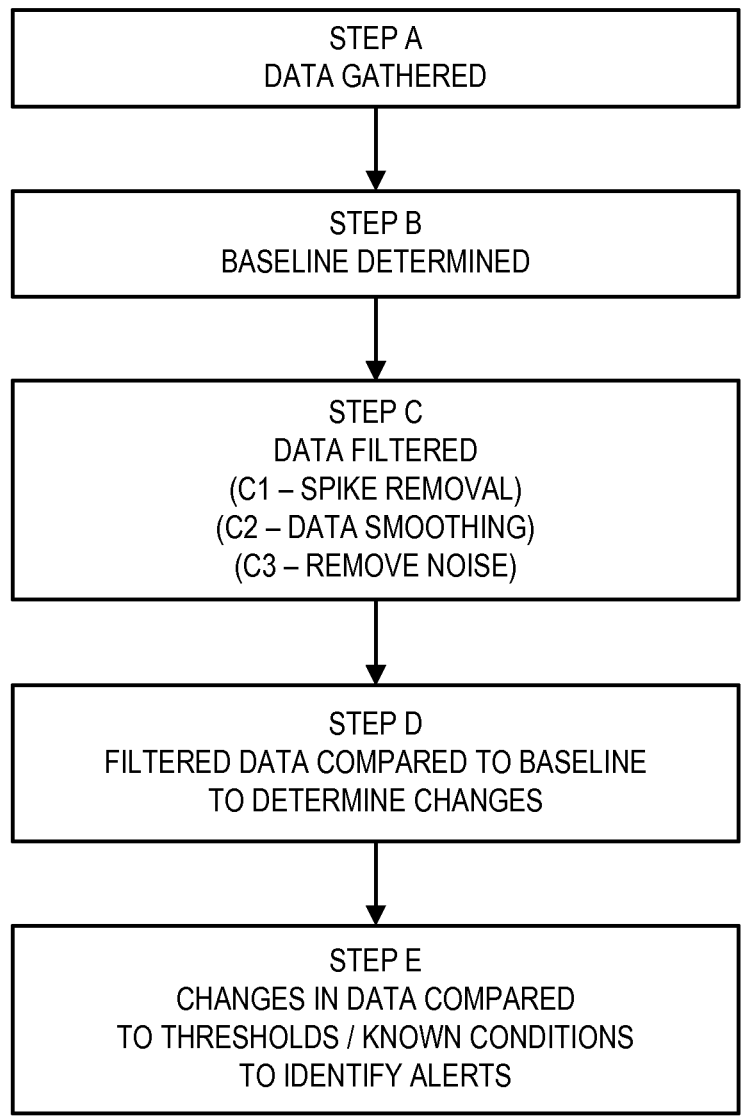
FIG. 1(c) is a flow chart of the basic step elements of a combined method of true/false determination in one embodiment of the present invention.
Figure 3:
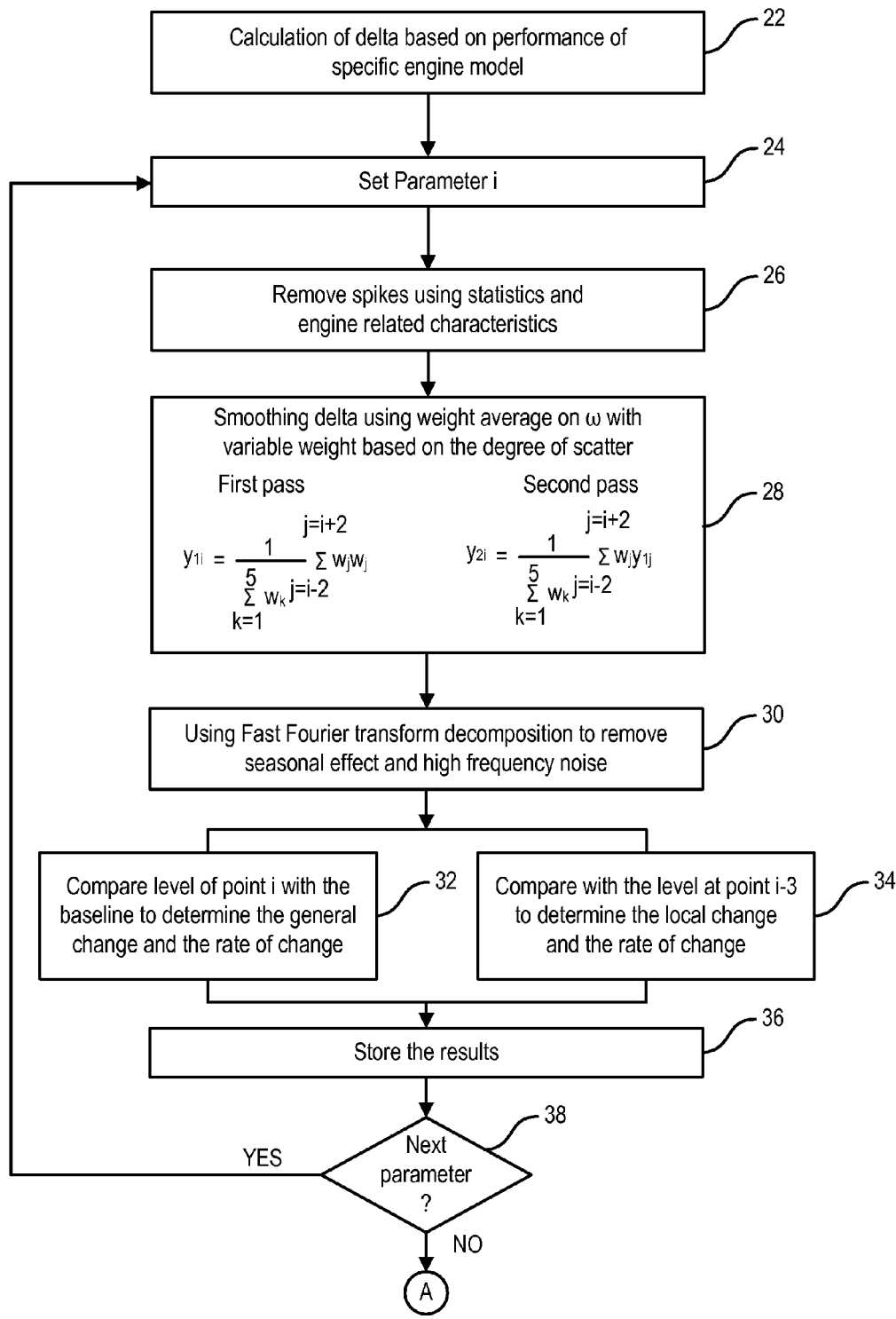
FIG. 3 is a flow chart of a data smoothing technique for use in the method of FIG. 1.

Referring now to FIGS. 1(c) and 3, one embodiment of data filtering uses a smoothing technique that involves the steps of spike removal, a low-point weight-averaging of the data and removing high frequency and low frequency noise, as will be each described in more detail below.

In the process depicted in FIG. 3, a counter or index is preferably used to facilitate automated execution of the calculations. Thus an index or counter i is set and maintained 24 accordingly, the results of the steps following are stored 36 and the steps are repeated 38 until performed on each data point in the set, as desired.

As a first step, each data point is examined for local spikes which, if found, are then removed 26 from the delta. Any threshold or a statistical type approach (or other approach) may be used for spike removal. An example threshold approach is to pre-specify a threshold value. The threshold can be used to locate and remove the spikes by discarding any data point which exceeds the threshold.

In one embodiment the threshold can be obtained using a statistical approach that reflects the "scattered-ness" of the data. (e.g. the threshold can be three times the standard deviation, and any points outside this range are considered spikes and discarded accordingly). In one embodiment an algorithm is utilized to determine and remove spikes is along the lines of the first concept above, as follows:

A data point is considered a spike and thus removed if: (1) It is higher or lower than both of two neighboring points (i.e. one on each side); and (2) Its absolute difference from the two neighboring points is greater than a predetermined threshold.

Referring still to FIGS. 1(c) and 3, once any spike has been corrected (as necessary), the data point is then preferably smoothed. As a non-limiting example smoothing is achieved using a weighted-average and regression technique, as follows.

First, a weighted-average value which takes into account data points (again, in this embodiment it is the delta data being analyzed) both before and after the current point, is evaluated recursively 28, as described below. The weight factor is preferably chosen to be small enough to retain the step changes and yet large enough to also smooth out the curve. As a non-limiting example a low-point weighted average is effective in achieving these goals.

As a non-limiting example a 5-point weighted average has been found to satisfactorily achieve this goal. The variable weight chosen is based on the degree of scatter in the data. The equation is adjusted accordingly for the first and last points.

In one embodiment the weighted-average calculation algorithm for the first pass of the smoothing is as follows:

$$y1_i = 1L \sum_{k=1}^{5} w_k \ L \sum_{j=i-2}^{i+2} \text{ where:}$$

i is the parameter value that is being addressed,
w j y j
   j goes from i−2 to i+2 (in a five-point average), wj is the weighting assigned for each j point in the calculation (here, for a 5-point average in gas turbine data analysis, weights of 0.1, 0.2, 0.4, 0.2 and 0.1 for each of j=i−2 to i+2 respectively, are preferred), k goes from 1 to the number of points of the average (which is, again, in this case 5), and yj is the value of data point j.

After the first pass through the data is computed, a second pass is then performed and the algorithm can be used for a second pass of the smoothing is similar, as follows:

$$y2_i = 1L \sum_{k=1}^{5} w_k \ L \sum_{j=i-2}^{i+2} w_j\ y1$$

where y1j is the corresponding weight-averaged value from the first pass, described above.

In one embodiment the data point is then further filtered to remove noise from the data. In particular the data is filtered to remove any low frequency noise (e.g. seasonal variation) to further locally smooth the curve. In one embodiment a standard Fast Fourier Transform (FFT) algorithm is used 30 to remove a certain number, as a non-limiting example can be two, of the lowest frequencies in the data, In one embodiment once the filtered delta data is obtained, the global change and local change are determined 32 and 34. Preferably global change is determined by comparing 32 the data point i with its relative baseline value. The local change is preferably calculated using a simple derivative-type calculation, wherein the local change and local rate of change is determined by comparison of the value at the point with the value at a previous (i.e. in time) point or points.

In one embodiment, a point i is compared with a previous point outside the original n-point weighted average smoothing calculation (described above) to prevent neighboring points from directly affecting each other in this averaging process. Here, because a 5-point average was used above in this example, the point i is compared 34 the point i−3 (i.e. third previous point) to calculate the local change and rate of change. Once filtering and the corresponding change and rate of change information has been computed, all results are preferably stored 36 for use in the alert identification process, described below.

As mentioned above, the steps 24 to 36 are performed for each parameter of the data until all data signals have been processed 38. The processing may be executed sequentially or in parallel.

Figure 4:
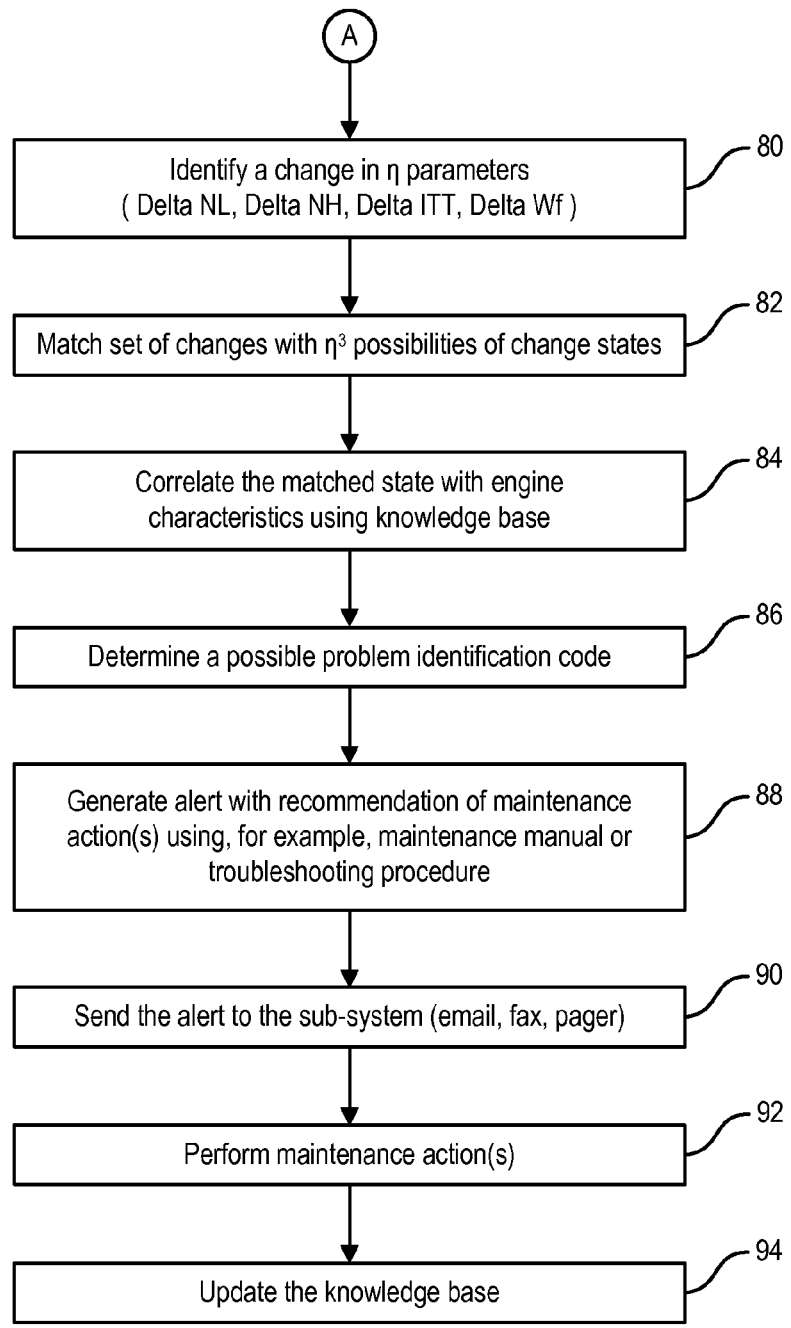
FIG. 4 is a flow chart of a data analysis technique for use in the method of FIG. 1.

Referring now to FIGS. 1(c) and 4, the next step is to review the data and mark alert conditions. A multiple parameter analysis can be performed.

Briefly a predetermined "acceptable" threshold value as a comparator can be used for each parameter, which may be either generic or data specific. An alert is thus generated preferably based on an analysis of (a) the global change (i.e. the difference between the base value and the smoothed value), and/or (b) the local change (i.e. difference between the smoothed value and a previous smoothed value), the calculation of both of which are described above. From the results of (a) and (b) the alert can be marked and classified as a "step" change or "gradual" change. (It will be understood that a "step" change is one in which there is an instantaneous change in the data over very few successive data points, whereas a "gradual" change is a change which occurs (often in a drifting fashion) usually over many successive data points). The problems may then be determined by an analysis of the changes and/or by a comparison of the combined true/false for all parameters with a knowledge base (preferably computerized) containing known engine conditions or problems. For example, in the described embodiment, if the combined true/false of (a) ITT is gradually up, (b) NH is gradually down, (c) NL is gradually up and (d) Wf is gradually up.

As a non-limiting example the analysis process can be executed in an algorithm of FIG. 4 as follows:

A change from the baseline is identified 80 for each parameter of a series of n parameters, preferably through the process shown in FIG. 3, i.e. by comparing a data point of interest (e.g. the last data point in the data stream) to the baseline. The "change status" is the value (i.e. magnitude) of the change in the parametric data. The "change set" is the set of change statuses identified 80 for all n parameters analyzed. There is a total of n3 change sets possible in a typical case, since a change status would typically be measured as either (1) an increase (between baseline and the examined data point), (2) a decrease or (3) status quo. Therefore, the particular change set identified at 80 is then matched 82 to one of the possible n3 change sets. Using an appropriate knowledge base, which can be a computer database with acquired data and considered "typical" and/or "desirable", the matched state is then correlated 84 to stored typical characteristics.

In the event that a possible "problem" is identified through the comparison with the knowledge base, a possible problem identification code is determined or selected 86 by or from the knowledge base. An alert message is then generated 88. The alert message can be sent 90. The alert message may be recorded for later retrieval and viewing.

Cloud Infrastructure

In one embodiment the Cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above.

The cloud based system facilitates adjusting utilization and/or allocation of hardware resource(s) to remote clients. The system includes a third party service provider, that is provided by the methods used with the present invention, that can concurrently service requests from several clients without user perception of degraded computing performance as compared to conventional techniques where computational tasks can be performed upon a client or a server within a proprietary intranet. The third party service provider (e.g., "cloud") supports a collection of hardware and/or software resources. The hardware and/or software resources can be maintained by an off-premises party, and the resources can be accessed and utilized by identified users over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a user can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from users. According to this example, the resources can be modular in nature, and thus, resources can be added, removed, tested, modified, etc. while the remainder of the resources can support servicing user requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third party service provider, while access can be denied to remaining portions of the data store(s) (e.g., the data store(s) can selectively mask memory based upon user/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g. employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

In one embodiment a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

In one embodiment a system employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

In one embodiment a system archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), and synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate users and/or client devices. For example, finegrained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third party service provider. Further, the restoration component can playback the recording.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface/body motion, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A distributed system, comprising:
    a plurality of managed devices of an infrastructure that includes a plurality of system parameters;
    at least one agent that runs on a managed device, the at least one agent determines which managed device it runs on, and detects an anomaly of the managed device, the at least one agent executes one or more files that define one or more policies relative to data retrieval with hosting done at an at least one agent level along and updating and changes of one or more management policies and anomaly detection is pushed out to the at least one agent;
    a dedicated polling server in communication with the at least one agent, with the at least one agent communicating over a message bus;
    a portal bridge in communication with the bus and communicates through a client's firewall to a Network System, the at least agent configured to pull over the message bus the one or more files that are relevant relative to an anomaly and determine which of the one or more files to run;
a server coupled to a repository that includes a database of anomalies and time series data that pass through the portal bridge in response to detection of the anomaly of the managed device, the database including acquired data relative to anomalies, wherein the repository includes of at least one of system parameters and anomalies run on the server; and
wherein the at least one agent is configured to discover a local environment and retrieve monitored client system parameters, the at least one agent performs at least one of: communicates a time data series or detects an anomaly, and in response to a detection of the anomaly the at least one agent checks a value for an anomaly and detected anomalies are communicated to the server, when an anomaly is not detected the agent sends a time series data point to the repository and when there are changes in the monitored system parameters the agent loads the change and restarts with the polling.

2. The system of claim 1, wherein the at least one agent is configured to discover its local environment and an event is a change in state of a managed device.

3. The system of claim 2, wherein in response to the at least one agent discovering its local environment, the managed device can determine what it is running.

4. The system of claim 2, further comprising:
    a web server in communication with a user interface configured to search for anomies that are situations.

5. The system of claim 1, further comprising:
    a search engine coupled to the database where the database provides storage relative to events and anomalies.

6. The system of claim 1, wherein the system performs polling by at least one of an embedded agent polling a managed local device, or across the Network System.

7. The system of claim 1, wherein the a repository is included in the database.

8. The system of claim 1, wherein in operation the at least one agent discovers its local environment and is configured to determine what managed device it is running on.

9. The system of claim 1, wherein in operation the at least one agent is configured to determine what to monitor on a managed device.

10. The system of claim 1, wherein in operation the at least one agent is configured to use configuration information used to query with the portal bridge to determine a list of monitored system parameters it needs to download and implement.

11. The system of claim 1, wherein time series data passes up through the portal bridge to discover anomalies representative of managed devices connectivity, where an anomaly is a situation relative to a managed device.

12. The system of claim 1, wherein updates a list of monitored system parameters to pass down through the portal bridge.

13. The method of claim 11, wherein detected anomalies are communicated back to the database.

14. The method of claim 11, wherein when an anomaly is not detected the at least one agent sends a time series data point to the database that is a repository of events and situations.

15. The method of claim 11, wherein the at least one agent loads a list of monitored system parameters changes and there is a restart with a polling.

* * * * *